United States Patent [19]

Jones et al.

[11] Patent Number: 4,589,770
[45] Date of Patent: May 20, 1986

[54] ELECTRO-OPTICAL RANGING APPARATUS HAVING SCANNING CIRCUITRY AND SERVOLOOP PROCESSOR FOR RESOLVING SEPARATION OF IMAGES ON PHOTOELECTRIC DETECTOR ARRAYS

[75] Inventors: Philip Jones, Bothell; William R. Jones, Kent; Moorfield Storey, Jr., Seattle, all of Wash.

[73] Assignee: The Boeing Company, Seattle, Wash.

[21] Appl. No.: 436,600

[22] Filed: Oct. 25, 1982

[51] Int. Cl.$^4$ ........................ G01C 3/00; G03B 13/18
[52] U.S. Cl. ..................................... 356/1; 354/408
[58] Field of Search ................. 356/1, 4; 354/402–409

[56] References Cited

U.S. PATENT DOCUMENTS

| | | |
|---|---|---|
| 3,134,104 | 5/1964 | Murphree et al. |
| 3,304,409 | 2/1967 | Snowdon et al. |
| 3,376,411 | 4/1968 | Montani et al. |
| 3,430,243 | 2/1969 | Evans . |
| 3,706,493 | 12/1972 | Redmann . |
| 3,873,984 | 3/1975 | Weisbrich, Jr. |
| 3,898,676 | 8/1975 | Hosoe et al. ........................ 354/404 |
| 3,961,851 | 6/1976 | Gerharz . |
| 4,009,960 | 3/1977 | Feldman et al. |
| 4,173,402 | 11/1979 | Horike et al. |
| 4,178,098 | 12/1979 | Asano et al. ........................ 356/1 |
| 4,189,232 | 2/1980 | Asano et al. . |
| 4,316,193 | 2/1982 | Jones et al. ........................ 343/458 |

Primary Examiner—S. C. Buczinski
Assistant Examiner—Gregory C. Issing
Attorney, Agent, or Firm—Christensen, O'Connor, Johnson & Kindness

[57] ABSTRACT

In an optical ranging apparatus, especially designed for measuring the range to a source of infrared radiation, a narrow band time-shift servoloop processor is used to resolve the offset (separation distance) of images of the infrared source that are projected onto first and second, juxtaposed photooptical detector arrays. The range (distance) to the infrared source is functionally related to the measured offset of the infrared images. To enable the servoloop processor to measure this offset, the outputs of the first and second detector arrays are automatically scanned by electronic scanning circuitry to develop first and second time-variable signals that represent the relative positions of the infrared images on the respective arrays. These time-variable signals are substantially overlapping, and the slight phase or time separation between these signals is related to the offset of the images on the detector arrays. The servoloop processor receives the substantially overlapping time-variable signals from the scanning circuitry and resolves the time difference therebetween as a continuously variable time shift $\Delta t$ signal. The measured offset is then fed to a ranging processor to produce a signal representing the range (R) to the distant infrared source.

2 Claims, 5 Drawing Figures

ELECTRO-OPTICAL RANGING APPARATUS HAVING SCANNING CIRCUITRY AND SERVOLOOP PROCESSOR FOR RESOLVING SEPARATION OF IMAGES ON PHOTOELECTRIC DETECTOR ARRAYS

BACKGROUND OF THE INVENTION

The invention relates to optical ranging apparatus for measuring the range (distance) to a source of electromagnetic radiation of infrared and smaller wavelengths.

In scientific, industrial, and military fields there is often the need to passively measure the range to a source of electromagnetic radiation. For example, it is known that the range to a scanning source of radio frequency emissions, e.g., surveillance radar can be determined by passive (non-radiating) ranging techniques in which the radiation is received at slightly different angles by first and second sensors spaced apart along an axis perpendicular to the direction of arrival of the source emissions and the range is derived from the timing information.

The invention described hereinafter pertains to the type of ranging technique involving a passive system and a nonscanning emitter, hence passive ranging on nonscanning emitters (PRONSE). More specifically, the invention is concerned with emitters of electromagnetic radiation in the optical range, namely infrared and smaller wavelengths.

Another related technique is used in determining the range to a source of electromagnetic radiation in the light spectrum. Optical ranging apparatus have been heretofore developed, as for example, disclosed in U.S. Pat. No. 4,178,098, in which the distant object that is emitting (or reflecting) a source of light, is directed onto first and second optical/photodetector assemblies mounted in juxtaposition and separated by a distance d. Relative positional parallax causes the image to be focused on slightly different positions separated by an offset, i.e., the image of one optical channel is slightly offset on the associated detector array as compared to the image focused on the detector array of the juxtaposed optical channel. This offset ($\Delta x$) is known to be related to the distance or range by a formula that includes the focal length of the optics, the distance d separating the centerlines of the optics, and the field of view of the optics. Furthermore, it is known that the offset $\Delta x$ may be measured by comparing the output signals from the detectors of the first and second arrays, and from the measured offset $\Delta x$, the range can be computed.

In electro-optical ranging apparatus and method of this type, however, the accuracy of the measurement depends upon the capability of the system to measure the offset $\Delta x$. For systems in which the separation distance d between the centerline of the optics is relatively small, compared to the range to the object or emitter of electromagnetic radiation, the optical images that are projected onto the photodetector arrays are very closely overlapping. In other words, the image focussed on a first of the side-by-side photodetector arrays falls nearly at the same corresponding position as the image on the second array. Thus, the separation or offset $\Delta x$ between the images is exceedingly small and the comparison of the detector output signals to extract this very small offset $\Delta x$ becomes crucial to the effectiveness of the equipment.

SUMMARY OF THE INVENTION

The present invention provides apparatus for passive ranging on nonscanning infrared and smaller wavelengths in an electro-optical system in which the offset between the electromagnetic images focused on the juxtaposed photodetector arrays is resolved by first scanning the detector elements of both arrays to produce time-variable analog electrical signals and then processing these signals in a narrow band servoloop processor of the special type further characterized herein to determine the time shift separating the substantially overlapping signals. The resolved time shift, representing the distance offset $\Delta x$, is then further processed in a range-determining circuit to produce a signal proportional to the range R as a function of the offset $\Delta x$ and other fixed, known parameters of the optics.

In accordance with the preferred embodiment, the continuously variable servoloop processor is of the type that produces an error signal representing the magnitude and phase difference between the time-variable signals that are to be resolved, and also derives a reference signal from one of the two input signals in which the reference signal has the same phase as the error signal. The like-phase, error, and reference signals are then multiplied and the product thereof is used as a correction signal that is applied to a variable delay device interposed serially in the path of the leading or early arriving signal to close the loop and delay the early signal until coincidence is achieved with the late or lagging input signal. The correction signal also serves as a measure of the time shift between the overlapping signals and hence, indirectly as a measure of the offset of the images on the detector arrays. By using a continuously variable time-shift, servoloop processor of the type characterized, infrared and other optical images focused on the detector arrays at substantially the same relative positions, can be accurately resolved for the offset $\Delta x$, which in turn enables accurate range measurements.

In the preferred form of the apparatus, scanning circuitry sequentially samples the outputs from the detectors in like locations on the first and second arrays, first in one direction of scan to complete a half-cycle, and then in a reverse direction of scan to complete a full cycle. At the end of a half-cycle of scan, at which time the last detector, for example, on the left-hand side of both the first and second arrays, has been sampled, the signals from the scanning circuitry are reversed prior to applying the time-varying signals to the servoloop processor, such that the signal information fed to the processor is always of the same phase. In other words, even though the image on the detector arrays is scanned first from right to left and secondly from left to right, the signal applied to a first input of the servoloop processor always leads (in phase) the late signal that is applied to the second input of the servoloop processor.

Also, in the preferred form of the apparatus, an angle of arrival detector is employed to independently detect the angle at which the infrared or other wavelength source arrives at the midpoint between the optical/detector assemblies. The angle of arrival detector produces a signal representing the angle of arrival $\phi$, which in turn is fed to the range processor for varying the output signal of the range as the angle of arrival varies to either side of a centerline that extends as a perpendicular bisector to the baseline separating the assemblies.

To provide a complete disclosure of the invention, reference is made to the appended drawings and following of one particular and preferred embodiment.

DETAILED DESCRIPTION OF THE PREFERRED EMBODIMENT

Figure 1:
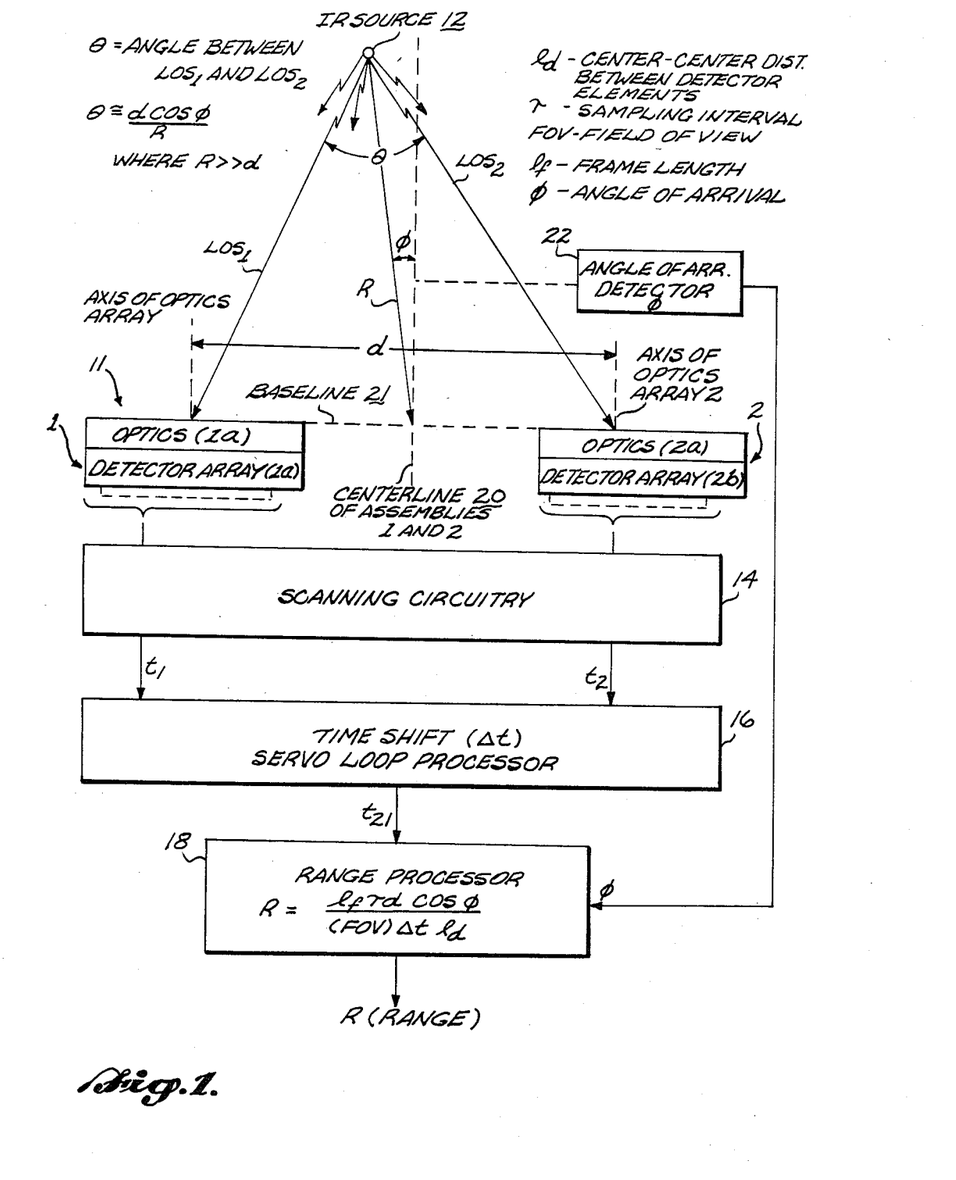
FIG. 1 shows the geometry and block diagram of a preferred embodiment of the invention showing an infrared light source, optical/detector assemblies, scanning circuitry, a time-shift servoloop processor, an angle of arrival detector and the range processor that develops the desired range measurement signal.

FIG. 1 shows a preferred embodiment of the electro-optical ranging apparatus 11 that is adapted for ranging on nonscanning infrared sources and that incorporates a time-resolving servoloop processor of the above-characterized type for resolving images of the infrared source focused on a pair of like, but spaced-apart photodetector arrays. In the described embodiment, apparatus 11 is specifically designed for ranging on infrared sources, however it will be appreciated that the invention can be employed for ranging on other sources of light which as the term is used herein, refers to electromagnetic radition of infrared, visible, ultraviolet, and X-ray wavelengths.

For this purpose, apparatus 11 incorporates a pair of identical optical/detector assemblies 1 and 2 having their respective optical axes or centerlines arranged in a spaced-apart parallelism pointing generally outwardly in the direction of an infrared (IR) source 12. The optical axes of assemblies 1 and 2 are separated along a baseline by a predetermined distance d. Assemblies 1 and 2 include, optics 1a and 2a, respectively, and arrays 1b and 2b of sensor or photoelectric detectors having wavelength sensitivities selected or optimum response to the source wavelength, in this case being infrared wavelengths. Each array 1b and 2b incorporates a plurality of individual juxtaposed detector elements arranged at a focal plane of optics 1a and 2a, respectively, in rows from right to left as viewed in FIG. 1. Optics 1a and 2a focus the images from IR source 12 on to the arrays and normally the images cover a plurality of the detector elements in each array.

Cooperating with the assemblies 1 and 2 are scanning circuitry 14, a time shift $\Delta t$ servoloop processor 16 and a range processor 18 which processes electrical signal information produced by arrays 1b and 2b in response to the projection of images of source 12 thereon. The processed signal information represents positional offset ($\Delta x$) of the images on arrays 1b and 2b, which in turn relate by other fixed and/or measured parameters, to the range (distance) R between apparatus 11 and source 12. Specifically the range R is that distance between a midpoint on a centerline 20 bisecting a baseline 21, along which assemblies 1 and 2 are separated, and the IR source 12. In those measurements in which source 12 is offset from centerline 20 such that the angle of arrival of radiation from source 12 is at an angle $\phi$ measured relative to either side of centerline 20, it is desirable to provide an angle of arrival detector 22 which measures the angle $\phi$ and feeds a signal representative thereof to range processor 18 to correct the range output signal for angle of arrival.

Figure 2:
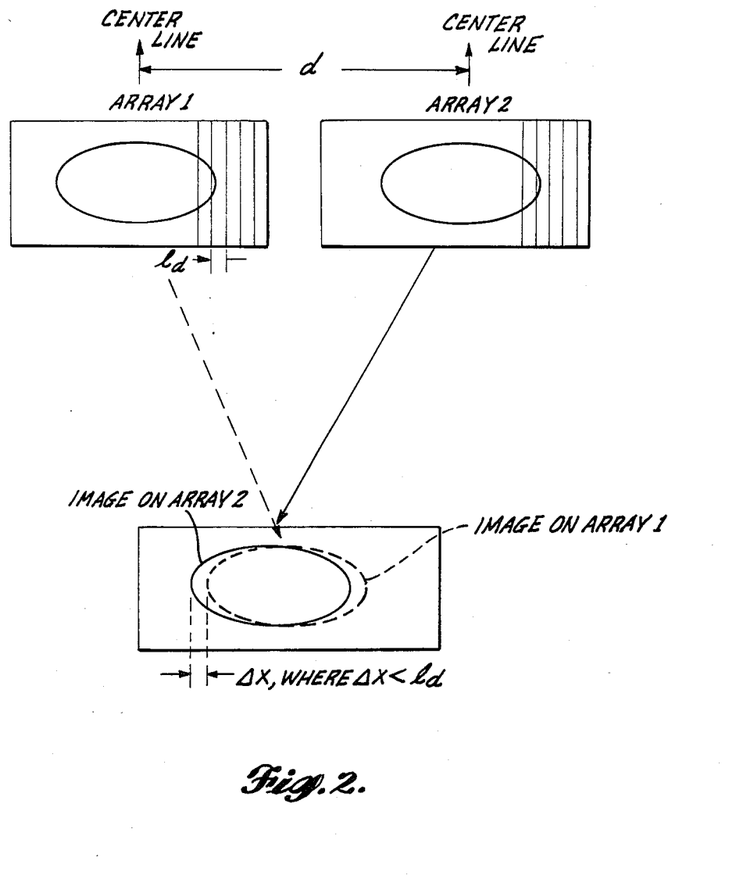
FIG. 2 is a diagram showing the separate images as they appear on the detector arrays of the first and second optical/detector assemblies, and how those images would substantially overlap if they were superimposed on the same detector array.

The juxtaposition of optical/detector assemblies 1 and 2 of apparatus 11 as shown in FIG. 1 causes radiation from source 12 to be focused onto slightly different positions on detector arrays 1b and 2b as illustrated in FIG. 2. Thus, the top left-hand portion of FIG. 2, a schematic drawing representing a plan view of detector array 1b is shown with an elliptical-shaped image 12' falling on a plurality of detector elements 24 that form the array; similarly in the upper right-hand portion of FIG. 2, another elliptical image 12" falls on a plurality of detector elements 24 of array 2b. The detector arrays 1b and 2b are identical in size and the number of constituent elements 24 and hence, each point location on array 1b will have a corresponding point location on array 2b.

As is known from optical ranging systems and devices, the separation of assemblies 1 and 2 along baseline 21 as shown in FIG. 1, causes the image from a distant radiation source such as IR source 12, to fall at relatively different positions on the focal or image planes of arrays 1b and 2b as illustrated in FIG. 2. This image offset is due to a form of parallax and is depicted in the lower illustration of FIG. 2 which for comparison superimposes the image 12' of array 1b on the image 12" of array 26. The offset ($\Delta x$) of these images, relative to corresponding point locations on the identical arrays 1b and 2b, is related to the amount of separation d between the optical axes of assemblies 1 and 2 and the range R to the source 12.

In relating the range R to the offset $\Delta x$ of images 12' and 12", it is known that the angle $\theta$ subtended at source 12 by the line of sight intercepts $LOS_1$ and $LOS_2$, with the respective centers of assemblies 1 and 2 can be approximately by their relationship:

$$\theta \approx (d \cos \phi / R), \qquad (1)$$

where R is much greater than d based on the small angle approximation of $\theta$ approximately equal to $\sin \theta$ for angles in the range of 10° or less.

Furthermore, it is known from optical theory that $\theta$ is related to the field of view (FOV) and frame length $l_f$ (distance at the image plane between images of point sources at opposite edges of the FOV) of optics 1a and 2a, and the offset $\Delta x$ of the images by the relationship:

$$(\theta / \Delta x) = FOV / l_f. \qquad (2)$$

This relationship of $\theta$, FOV, $\Delta x$ and $l_f$ is valid for fields of view that are sufficiently narrow, i.e., where the approximation of:

$$\tan (FOV/2) = (FOV/2).$$

Substituting the relationship for the angle $\theta$ from the first-mentioned equation results in a relationship for the range R of:

$$R = (l_f d \cos \phi / (FOV) \Delta x) \quad (3)$$

With further reference now to FIG. 1, scanning circuitry 14 and servoloop processor 16 serve to accurately measure the offset $\Delta x$ caused by the slight positional difference of the images on arrays 1b and 2b by electrically scanning the output conditions of the plurality of detector elements that comprise arrays 1b and 2b so as to produce signals that represent the respective image positions. A first timing signal $t_1$ is generated having an amplitude versus time envelope that is the electrical signal analog of the position of the infrared image 12'' on detector array 1b (see FIGS. 1 and 2). Likewise a second timing signal $t_2$ is developed that has an amplitude versus time envelope that is the analog of the position of infrared image 12'' on array 2b (see FIGS. 1 and 2). As described more fully below in connection with FIGS. 3 and 4, the timing signals $t_1$ and $t_2$ represent, in time and amplitude, the respective positions of the infrared images along arrays 1b and 2b.

The difference in the otherwise identical amplitude versus time envelopes of signals $t_1$ and $t_2$ is now measured in the time shift $\Delta t$ extracted by servoloop processor 16. The effectiveness of processor 16 in extracting the small time differences between signals $t_1$ and $t_2$ is attributed to the nature of processor 16 which, as described above, is of the type that derives from the input signals an error signal and a reference signal of substantially the same phase, and multiples the like-phase, error, and reference signals to produce as their product a correction signal that is integrated and used to control a delay of the (earlier) leading signal until the error signal is reduced to zero. The magnitude of the integrated correction signal equals the time shift $t_{21}$ by which the input signals $t_1$ and $t_2$ to processor 16 are separated in phase.

A processor 16 having these characteristics and being suitable for use in combination with scanning circuitry 14 is disclosed in detail in U.S. Pat. No. 4,316,192 issued Feb. 16, 1982 to Philip Jones and Moorfield Storey, Jr. and the disclosure in such issued U.S. patent is expressly incorporated herein.

As shown in FIG. 1, the signal representing the resolved time difference or shift $\Delta t$ that is available at the output of processor 16 is applied to range processor 18. The time shift $\Delta t$ signal, in effect, is a function of the offset $\Delta x$ and is related to $\Delta x$ by the known and fixed parameters of the sampling interval $\tau$ associated with scanning circuitry 14 and the center-to-center distance $l_d$ between adjacent detector elements of arrays 1b and 2b. More specifically, the time shift between the envelopes of analog signals $t_1$ and $t_2$ is given by the equation:

$$\Delta t = (\Delta x / l_d / \tau) = \tau \Delta x / l_d \quad (4)$$

This equation can be expressed in terms of $\Delta x$ as:

$$\Delta x = (\Delta t l_d / \tau), \quad (5)$$

and when $\Delta x$ is substituted into the above equation (3) for range R, the resulting expression is:

$$R = (l_f d \tau \cos \phi / (FOV) \Delta t \, l_d). \quad (6)$$

In the range processor 18, the variables are the input electrical signals for $t_{21}$ from processor 16 and the signal for the angle of arrival $\phi$ produced by detector 22. The remaining factors in the equation for range R are fixed parameters that are accounted for in the signal processing performed by processor 18 by constant input signals and/or fixed value components. These predetermined, fixed parameters include the frame length $l_f$, the sampling interval $\tau$, the distance d between the centerlines of assemblies 1 and 2, the field of view (FOV) and the center-to-center distance $l_d$ between detector elements 24 of each of the arrays.

Figure 3:
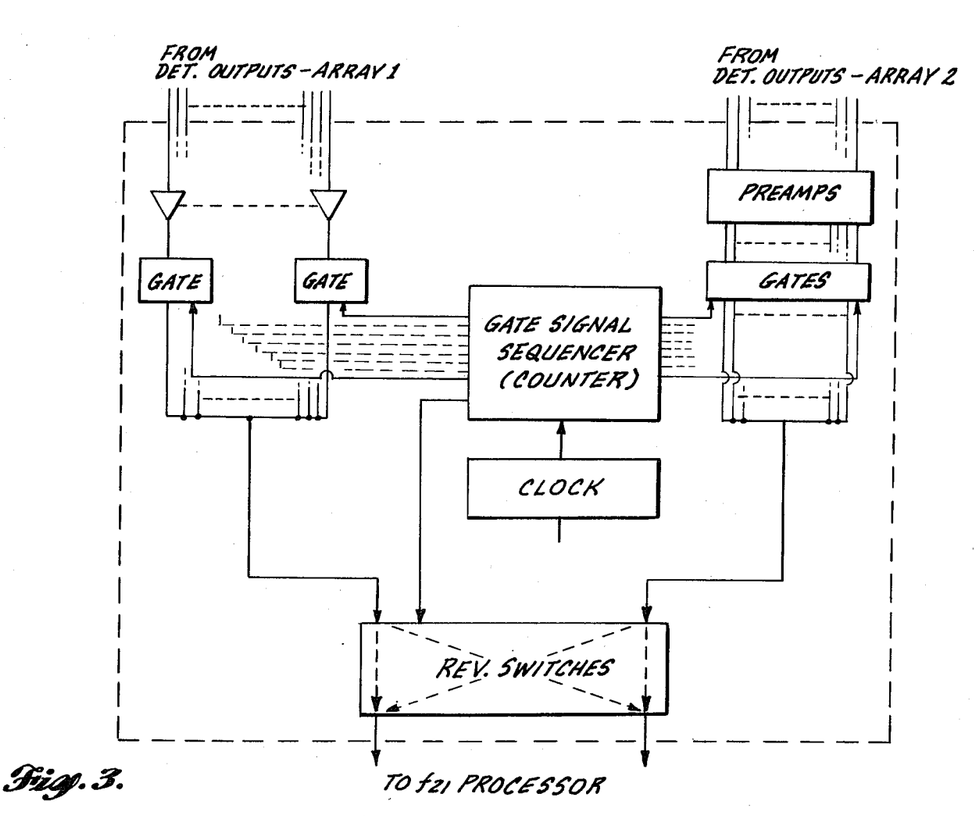
FIG. 3 is a detailed block diagram of the scanning circuitry of FIG. 1.

With reference to FIG. 3, scanning circuitry 14 is shown in greater detail to include a first input channel 30 formed by a plurality of input leads 301, 302, 303–30n connected to the detector elements of array 1b, and second input channel 32 comprised of a plurality of input leads 321, 322, 323–32n of leads connected to the detector elements of array 2b. With reference to the first input channel 30, the input leads 301–30n are coupled to a corresponding plurality of preamplifiers 34, which boost the voltage outputs from the detectors and apply the preamplified signals to a corresponding plurality of gates 36, one for each preamplifier. The outputs of gates 36 are connected jointly to a common junction 38 where the sampled detector output signals are combined. A plurality of control inputs for gates 36 are connected to a corresponding plurality of gate control leads 40 (one for each gate 36) that extend from a gate signal sequencer 42.

Similarly at input channel 32, the detector output signals on the plurality of input leads 321–32n are amplified by preamplifiers 44 (corresponding to the individually illustrated preamplifiers 34 of input channel 30). The amplified outputs from preamplifiers 44 are then individually applied to the inputs of a plurality of gates 46, again corresponding to the separately illustrated gates 36 of channel 30, and the signal outputs of gates 46 are combined at a common output junction 48. The control inputs of gates 46 are connected individually to the plurality of output control leads 40 from gate signal sequence 42 and hence in parallel with the corresponding control inputs of gates 36.

Sequencer 42, which for example, may be a ring counter is driven through its counting states by a sequence of uniformly spaced clock pulses generated by clock 50. In a complete cycle of sequencer 42 gates 36 and 46 are opened sequentially from right to left as viewed in FIG. 3 to scan the arrays 1b and 2b from right to left as viewed in FIG. 2, and then gates 36 and 46 are operated in reverse order from left to right to complete a full cycle.

Reversing switches 52 are connected to leads 38a and 48a from junctions 38 and 48, respectively and serve to flip-flop the output signals on these leads at the end of each half cycle of sequencer 42. The reversal occurs in response to an output from control lead 54 that extends to switches 52 from sequencer 42. As explained more fully below, reversing switches 52 allow the sequencer 42 to scan the arrays 1b and 2b, first from right to left and then from left to right and produce at outputs 56 and 58 of circuitry 14, timing signals $t_1$ and $t_2$ that always have the same relative time difference to be extracted by processor 16 (FIG. 1).

Figure 4:
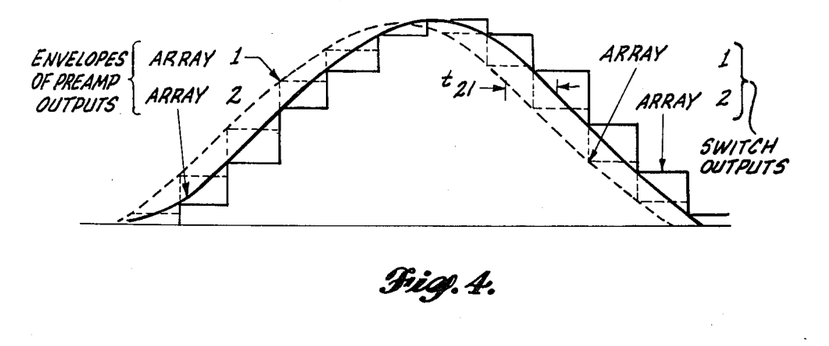
FIG. 4 is a diagram of the stepwise variable signals that result from scanning the individual detector elements of the detector arrays and of the signal envelopes defined by such stepwise varying output signals.

With reference to both FIGS. 3 and 4, the scanning circuitry 14 functions to scan both arrays 1b and 2b in unison and at a scanning rate that is adequate to develop time/amplitude envelopes as depicted in FIG. 4. For this purpose, sequencer 42 acts through control leads 40 to selectively open the first of gates 36 and 46 (for example, the gates associated with leads 301 and 321), enabling the preamplified output voltages from these corresponding detector elements to appear at junctions 38 and 48, respectively. The first set of gates is then closed by control leads 40 and the adjacent sets corresponding to leads 302 and 322 are then opened. The opening and closing of gates 36 and 46 thus proceeds sequentially, with the pair of corresponding gates in the two input channels being operated in unison. The duration for which the individual gates remain open, is determined by the sampling interval $\tau$ (dwell time) established by the operation of sequencer 42.

Thus, as the gates 36 and 46 are sequentially opened and closed, the detector elements that are excited by the infrared image on the respective arrays 1b and 2b create stepwise voltage conditions at junctions 38 and 48 that represent the position and strength of the respective images along the arrays. For example, in FIG. 4, it is assumed that sequencer 42 has an initial forward scan direction of the arrays from right to left as they are illustrated in FIGS. 2 and 3. Thus, as the operation of gates 36 and 46 progresses from right to left in the forward scan direction, one of gates 36 will be opened to pass a signal associated with the leading edge of image 12' on array 1b as indicated by comparing FIGS. 2 and 4. The dwell of this gate is for the sampling interval $\tau$ as shown on the wave form of FIG. 4.

As the scanning by sequencer 42 continues the amplitude of the signal at junction 38 (FIG. 3) rises in stepwise fashion toward a peak amplitude. The envelope of the stepwise changing signal shown by dotted lines in FIG. 4, represents the position and area covered by the image 12' on array 1b. Just slightly lagging the dotted line envelope of the signal derived from array 1b, is another stepwise increasing signal shown by solid lines and representing the signal output at junction 48 derived from image 12'' on array 12b. The envelope of this signal derived from array 2b is shown by a solid line in the wave forms of FIG. 4.

Thus, comparing the leading edges of the signal envelopes derived from arrays 1b and 2b in FIG. 4 when sequencer 42 scans gates 36 and 46 in the forward direction, the signal envelope from array 1b representing image 12' leads (early signal) the signal envelope derived from array 2b representing image 12'' (late signal). This phase relationship follows through as the signals peak and fall in amplitude. Hence, the envelope signal from array 1b representing image 12' is the first to fall off to zero, followed by the envelope derived from array 2b and represents the nonoverlapping area of the images adjacent to the left-hand side of the arrays as depicted in FIG. 2.

When sequencer 42 reaches the last of gates 36 and 46 that are associated with the detector elements on the far left-hand side of arrays 1b and 2b (FIG. 2), a reversing signal is issued over lead 54 to cause reversing switches 52 to reverse the connections between outputs 56 and 58 with leads 38a and 48a and sequencer 42 resumes scanning but now in the reverse scan direction from left to right as viewed in FIGS. 2 and 3. The reversal of switches 52 causes the output signal envelope developed at junction 38 to appear at lead 58 and represents the leading edge of the envelope signals, which, in this instance, will correspond to image 12' on array 1b. The envelope signal appearing at junction 48 and developed from array 2b, based on image 12'', will appear at output junction 56 of circuitry 16. While the relationship of output leads 56 and 58 has now been reversed relative to the forward scan, there will still appear at these output leads, a leading (early signal) and a trailing (late signal) representing the same offset relationship as in the forward scan because of the symmetry (along the direction of the scanning) of the offset images as shown in FIG. 2. Thus, the envelope signals appearing at outputs 56 and 58 and referred to as $t_1$ and $t_2$ maintain the same phase relationship, even though the scanning direction determined by sequencer 42 changes from forward to reverse. The reversal of scan direction and switches 52 is automatically and repetitively effected at each of the ends of the scanned arrays 1b and 2b. The repetitive scanning improves the accuracy by averaging out thermal noise induced errors.

Thus, scanning circuitry produces signals $t_1$ and $t_2$ as leading (early) and trailing (late) signals of substantially identical shape and having a slight, but measurable, offset relationship that is the timing analog of the positional offset $\Delta x$ of the images on arrays 1b and 2b. Each time sequencer 42 (FIG. 3) completes a scan across arrays 1a and 2b, the leading and trailing signals $t_1$ and $t_2$ are produced in the form shown in FIG. 4. The repetition rate of such signals depends, of course, on the clocking frequency of sequencer 42 and hence on the clock rate established by clock 50. While this clock rate and the resulting scanning rate can be varied, depending upon the desired resolution of apparatus 11, by way of example, a scanning rate of 1000 detectors per second has been used in this embodiment with satisfactory results.

Figure 5:
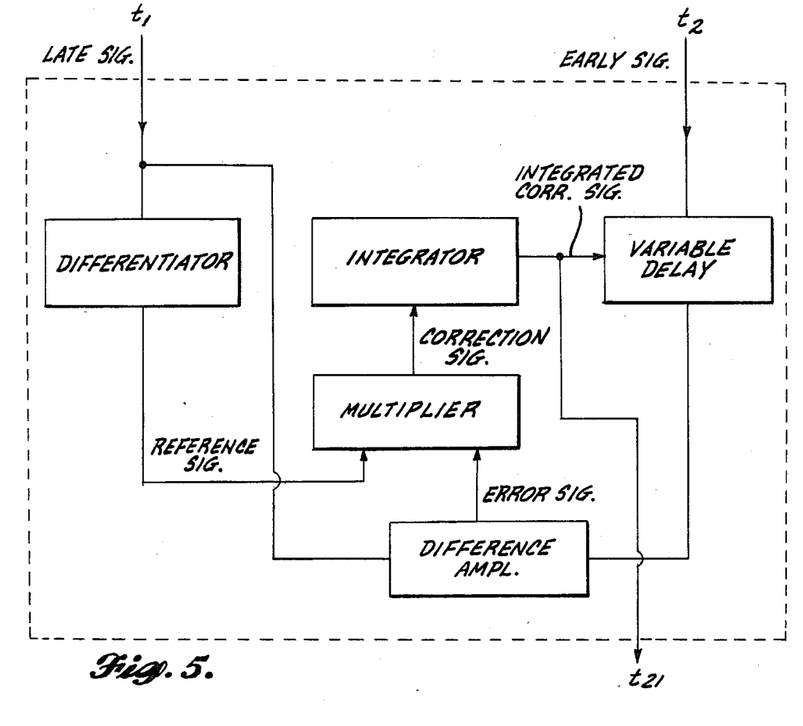
FIG. 5 is a block diagram of the time-shift servoloop processor of the apparatus shown in FIG. 1.

Servoloop processor 16 (FIG. 1) receives the leading and trailing signals $t_1$ and $t_2$ from circuitry 14 and extracts therefrom, the slight, but measurable, time-shift $\Delta t$ between these signals. For this purpose, processor 16 must be of a type that is capable of resolving time-shift values for $\Delta t$ in the range of 50 microsec. to 700 microsec. For this purpose, processor 16 is of the above-characterized type and as shown in FIG. 5, a suitable embodiment incorporates the principal components of a differentiator 60, variable delay 62, a difference amplifier 64, a multiplier 66, and an integrator 68. As described more fully in the above-referenced U.S. Pat. No. 4,316,193, variable delay 62 receives the early signal, in this instance $t_1$, and delays such signal by a variable amount determined by an integrated correction signal developed by integrator 68. The variably delayed signal $t_1$ is compared in a difference amplifier 64 with the late signal, in this instance, $t_2$, and the difference in the form of an error signal is produced and applied as one input to a multiplier 66. Another input of multiplier 66 is a reference signal developed by differentiating the late signal $t_2$ in differentiator 60. The reference signal produced by differentiator 60 is characterized by having a phase relationship that is substantially the same as the error signal produced by difference amplifier 64, such that multiplication of the reference and error signals in multiplier 66 produces a correction signal of proper amplitude and phase and one that can be filtered in an integrator 68 to develop a narrow-band integrated correction signal for controlling delay 62. Servoloop processor 16 will respond to the timing or phase difference between the early and late signals $t_1$ and $t_2$ until the earlier signal has been delayed sufficiently by variable delay 62 to reduce the error signal to zero, at which time the integrated correction signal available at the output of integrator 68 equals the timing difference or shift $\Delta t$, which is produced at output 70.

With reference again to FIG. 1, the resolved time-shift signal $\Delta t$ is now applied to range processor 18 along with the signal representing $\phi$, angle of arrival.

Processor 18 now operates in accordance with known digital and/or analog computer processing circuitry to develop a signal representing range based on the relationship referred to above and shown in the block of processor 18 of FIG. 1.

While the particular values and design choices selected for the nonvariable aspects of apparatus are not believed critical, by way of example, the presently disclosed and preferred embodiment uses the following specifications:

Design values for IR ranging on a source 12 located between 5 m. miles and 70 m. miles from apparatus 11:

Optics 1a and 2a: FOV=0.25 degree $l_f$=0.26 inches

Detector arrays 1b, 2b: number of detector elements per array=1536

$l_d$=0.004 inches $\tau$=1 milisec.

Scanning rate of sequencer 42=1000 detectors per sec.

While, as shown in FIG. 2, arrays 1b and 2b are formed by a plurality of detector elements 24 that are each of generally elongated shape across the face of the array (top to bottom as shown in FIG. 2 and normal to the direction of scanning) so that each detector element is responsive not only to the left-to-right-hand position of images 12' and 12", but also the amplitude of such signals are a function of the height of such images as viewed in FIG. 2. In an alternative embodiment, detector elements 24 may each be segmented into a plurality of vertically stacked segments (as viewed in FIG. 2) and electrically coupled (along the vertical stack) to achieve the desired response to both the position and area of infrared images 12' and 12".

While only a particular embodiment has been disclosed herein, it will be readily apparent to persons skilled in the art that numerous changes and modifications can be made thereto, including the use of equivalent means and devices without departing from the spirit of the invention.

The embodiments of the invention in which an exclusive property or privilege is claimed are defined as follows:

1. An electro-optical apparatus for measuring the range R to a distant source of light, comprising:
    first and second optical/detector assemblies, each of which comprises optics having an optical axis, a field of view FOV and frame length $l_f$, and an array of photoelectric detector elements arranged at a center-to-center distance $l_d$ along a predetermined scanning direction on a focal plane normal to said optical axis and upon which an image of said source is focused by said optics, said first and second assemblies being arranged with said optical axes parallel and spaced apart by a predetermined distance d along a baseline that in turn defines a perpendicular bisector, said assemblies adapted for being oriented so that said perpendicular bisector defined by said baseline points generally in the direction of a distant source of light such that images of the source are focused by said optics on said arrays at relatively different positions with respect to corresponding points on said arrays wherein such difference in the image positions is defined by an image offset $\Delta x$;
    scanning circuitry means connected to said detector elements of said arrays of said first and second assemblies for electrically, sequentially sampling output signals at a predetermined sampling interval $\tau$ from said array of said detector elements of said first assembly, and in unison therewith sequentially sampling output signals at said interval $\tau$ from said array of detector elements of said second assembly so as to produce a first time/amplitude-varying signal $t_1$ representing the image position on said array of said first optical/detector assembly and so as to produce, in concert therewith, a second time/amplitude-varying signal $t_2$ representing the image position on said array of said second optical/detector assembly wherein said signals $t_1$ and $t_2$ exhibit a phase difference referred to as time-shift $\Delta t$ that in turn represents said offset $\Delta x$ of images on said arrays, said scanning circuitry means comprising the subcombination of:
        a first channel having a first plurality of preamplifiers individually connected to said detector elements of said first optical/detector assembly, and a first plurality of signal control gates connected individually in series between said first plurality of preamplifiers and a first, signal-combining junction;
        a second channel comprising a second plurality of preamplifiers connected individually to said detector elements of said second optical/detector assembly, and a second plurality of signal-controlled gates connected individually in series between said second plurality of preamplifiers and a second signal-combining junction;
        gate signal sequencer means having a plurality of gate-controlling output leads connected to corresponding ones of said first and second plurality of gates such that said sequencer means actuates a set of corresponding gates from said first and second channels simultaneously and operates different gates in said first and second channels sequentially to sample the output signals through said first and second pluralities of preamplifiers and associated detector elements from both said first and second optical/detector assemblies in unison, whereby the sampled signals from said first and second assemblies appear at said first and second signal-combining junctions, respectively; and
    output means for communicating said first and second signal-combining junctions to first and second outputs of said scanning circuitry at which time/amplitude-varying signals are produced representing the positions of the source image on said optical/detector assemblies, said output means comprising the subcombination of:
        reversing switching means coupling said first and second signal-combining junctions to said first and second outputs and having a first switching state in which said first signal-combining junction is coupled to said first output of said scanning circuitry and said second signal-combining junction is coupled to said second output of said scanning circuitry, and having a second state in which said signal-coupling relationship is reversed; and
        reversing switching control means coupled to said sequencer means for changing said reversing switching means from said first state to said second state at predetermined times so that said time/amplitude-varying signals appearing at said first and second outputs of said switching circuitry means always exhibit the same leading-trailing phase relationship;

a servoloop processor having inputs connected to receive said signals $t_1$ and $t_2$ from said scanning circuitry means and having an output at which a signal is produced representing said time shift $\Delta t$ measured from said input signals $t_1$ and $t_2$, said servoloop processor comprising the subcombination of:

variable delay means connected to a first input of said processor for variably delaying that one of said input signals $t_1$ and $t_2$ that leads the other input signal;

difference-taking means for receiving the variably delayed signal from said variable delay and the trailing signal from a second input to said processor for producing an error signal corresponding to the phase difference therebetween;

differentiator means connected to said second input of said processor for differentiating the signal thereat to produce a reference signal having substantially the same phase as said error signal;

multiplier means connected to said difference-taking means and to said differentiator for multiplying said error signal with said reference signal to produce a correction signal;

integrator means connected to said multiplier means for receiving and integrating said correction signal, said integrator means having an output producing an integrated correction signal that is connected to said variable delay means for controlling the amount of delay produced thereby; and said output of said processor connected to said output of said integrator means for providing at said processor output said time-shift signal $\Delta t$ as said integrated correction signal; and a range processor having an input connected to said time-shift servoloop processor for receiving said signal representing said time shift $\Delta t$ and having means responsive thereto for producing an output signal representing range R as a function of said time-shift signal $\Delta t$ in accordance with the relationship:

$$R = (l_f r d / (FOV) \Delta t \, l_d).$$

2. An electro-optical apparatus for measuring the range R to a distant source of light, comprising:

first and second optical/detector assemblies, each of which comprises optics having an optical axis and an array of photoelectric detector elements arranged along a predetermined scanning direction on a focal plane normal to said optical axis and upon which an image of said source is focused by said optics, said first and second assemblies being arranged with said optical axes parallel and spaced apart by a predetermined distance d along a baseline that in turn defines a perpendicular bisector, said assemblies adapted for being oriented so that said perpendicular bisector defined by said baseline points generally in the direction of a distant source of light such that images of the source are focused by said optics on said arrays at relatively different positions with respect to corresponding points on said arrays wherein such difference in the image positions is defined by an image offset $\Delta x$;

scanning circuitry means connected to said detector elements of said arrays of said first and second assemblies for electrically, sequentially sampling output signals from said array of said detector elements of said first assembly, and in unison therewith sequentially sampling output signals from said array of detector elements of said second assembly so as to produce a time/amplitude-varying signal $t_1$ on a first output lead representing the image position on said array of said first optical/detector assembly and so as to produce, in concert therewith, a time/amplitude-varying signal $t_2$ on a second output lead representing the image position on said array of said second optical/detector assembly wherein said signals $t_1$ and $t_2$ exhibit a phase difference referred to as time-shift $\Delta t$ that in turn represents said offset $\Delta x$ of images on said arrays;

said scanning circuitry means including scan reversing switch means for sequentially sampling output signals from said arrays of said first and second assemblies in one direction and then in a reverse direction of scanning, and for reversing the connection of said output leads to said servoloop processor at each reversal of said direction of scanning so as to maintain a continuous leading-trailing relationship of said signals $t_1$ and $t_2$ at said inputs to said servoloop processor;

a servoloop processor having inputs connected to receive said signals $t_1$ and $t_2$ on said first and second output leads from said scanning circuitry means and having an output at which a signal is produced representing said time shift $\Delta t$ measured from said input signals $t_1$ and $t_2$; and a range processor having an input connected to said time-shift servoloop processor for receiving said signal representing said time shift $\Delta t$ and having means responsive thereto for producing an output signal representing range R as a function of said time-shift signal $\Delta t$.

* * * * *

UNITED STATES PATENT AND TRADEMARK OFFICE
CERTIFICATE OF CORRECTION

PATENT NO.    : 4,589,770
DATED         : May 20, 1986
INVENTOR(S)   : Jones et al.

It is certified that error appears in the above-identified patent and that said Letters Patent is hereby corrected as shown below:

Column 1,  line 61, "focussed" should be --focused--
Column 3,  line 39, "radition" should be --radiation--
Column 4,  lines 43 & 44, "approximately" should be --approximated--
Column 5,  line 34, "$t_{21}$" should be -- $\Delta t$ --
           line 65, "$t_{21}$" should be -- $\Delta t$ --
Column 6,  line 37, "sequence" should be --sequencer--
Column 7,  line 25, "wave form" should be --waveform--
           line 37, "wave forms" should be --waveforms--
           line 65, "junction" should be --lead--
Column 11, line 12, "t1" should be --$t_1$--
           line 12, "t2" should be --$t_2$--
Figure 2,  Reference numerals added.
Figure 3,  Reference numerals added.
           Gates 36 now shown connected
           in parallel to gate signal sequencer 42.
Figure 4,  Reference numerals added.
Figure 5,  Reference numerals added.

Figure 1, "$t_{21}$" (output of 16) has been changed to --$\Delta t$--.

Figures 1-5 should be shown as per attached sheets.

Signed and Sealed this

Ninth Day of December, 1986

Attest:

DONALD J. QUIGG

Attesting Officer          Commissioner of Patents and Trademarks